United States Patent
Anderson et al.

(10) Patent No.: US 6,609,654 B1
(45) Date of Patent: Aug. 26, 2003

(54) METHOD FOR ALLOWING A USER TO CUSTOMIZE USE OF A PAYMENT CARD THAT GENERATES A DIFFERENT PAYMENT CARD NUMBER FOR MULTIPLE TRANSACTIONS

(75) Inventors: Roy L. Anderson, Glendale, CA (US); William R. Bryant, Jr., Manasas, VA (US); Jacob Y. Wong, Goleta, CA (US)

(73) Assignee: PrivaSys, Inc., San Francisco, CA (US)

( * ) Notice: Subject to any disclaimer, the term of this patent is extended or adjusted under 35 U.S.C. 154(b) by 0 days.

(21) Appl. No.: 09/667,161

(22) Filed: Sep. 21, 2000

Related U.S. Application Data

(63) Continuation-in-part of application No. 09/659,434, filed on Sep. 8, 2000, which is a continuation-in-part of application No. 09/640,044, filed on Aug. 15, 2000, which is a continuation-in-part of application No. 09/619,859, filed on Jul. 20, 2000, which is a continuation-in-part of application No. 09/571,707, filed on May 15, 2000.

(51) Int. Cl.$^7$ .............................................. G06F 17/60
(52) U.S. Cl. ......................... 235/379; 235/380; 705/39
(58) Field of Search .................................. 235/379, 380; 705/39, 44, 26

(56) References Cited

U.S. PATENT DOCUMENTS

| | | |
|---|---|---|
| 4,102,493 A | 7/1978 | Moreno |
| 4,437,130 A | 3/1984 | Hennessy et al. |
| 4,443,027 A | 4/1984 | McNeely et al. |
| 4,614,861 A | 9/1986 | Pavlov et al. |
| 4,634,845 A | 1/1987 | Hale et al. |
| 4,650,978 A | 3/1987 | Hudson et al. |
| 4,679,236 A | 7/1987 | Davies |
| 4,689,478 A | 8/1987 | Hale et al. |
| 4,701,601 A | 10/1987 | Francini et al. |
| 4,707,594 A | 11/1987 | Roth |

(List continued on next page.)

FOREIGN PATENT DOCUMENTS

| | | |
|---|---|---|
| AU | 732877 | 12/1998 |
| EP | 0 661 675 A2 | 5/1995 |
| EP | 0 722 241 A2 | 7/1996 |
| JP | 355143679 A | 10/1980 |
| JP | 402148374 A | 7/1990 |
| JP | 405040864 A | 2/1993 |
| WO | WO 99/38129 | 7/1999 |
| WO | WO 99/49424 | 9/1999 |
| WO | WO 99/57675 | 11/1999 |
| WO | WO 00/25262 | 5/2000 |
| WO | WO 00/30048 | 5/2000 |
| WO | WO 00/49586 | 8/2000 |
| WO | WO 00/52900 | 9/2000 |
| WO | WO 00/54208 | 9/2000 |
| WO | WO 01/46902 A1 | 6/2001 |
| WO | WO 01/46902 A1 | 7/2001 |
| WO | WO 01/54082 A1 | 7/2001 |

*Primary Examiner*—Michael G. Lee
*Assistant Examiner*—Steven S. Paik
(74) *Attorney, Agent, or Firm*—Patent Trademark Office

(57) ABSTRACT

A user can customize use of a payment card, which can be an electronic card, by selecting either a first or a second user key as a selected user key. The selected user key is entered into a card number generator that uses it and a user sequence number to generate a user payment card number that differs for each transaction through use of an algorithm. Multiple payment card transactions can be handled differently depending upon which user key is chosen as the selected user key. Different user keys can be used for different accounts, different types of transactions, or to classify the transactions. A user can receive one bill, or multiple bills. Different levels of privacy can be accorded to transactions that use different user keys. A user may pay the issuer for increased security, or the user may be paid by the issuer to allow transaction data to be distributed to third parties.

36 Claims, 1 Drawing Sheet

U.S. PATENT DOCUMENTS

| | | |
|---|---|---|
| 4,742,351 A | 5/1988 | Suzuki |
| 4,772,782 A | 9/1988 | Nonat |
| 4,791,283 A | 12/1988 | Burkhardt |
| 4,837,822 A | 6/1989 | Crosley et al. |
| 4,849,613 A | 7/1989 | Eisele |
| 4,868,376 A | 9/1989 | Lessin et al. |
| 4,918,631 A | 4/1990 | Hara et al. |
| 4,990,759 A | 2/1991 | Gloton et al. |
| 5,130,519 A | 7/1992 | Bush et al. |
| 5,192,947 A | 3/1993 | Neustein |
| 5,220,501 A | 6/1993 | Lawlor et al. |
| 5,317,636 A | 5/1994 | Vizcaino |
| 5,412,192 A | 5/1995 | Hoss |
| 5,426,283 A | 6/1995 | Berthozat et al. |
| 5,471,045 A | 11/1995 | Geronimi |
| 5,473,690 A | 12/1995 | Grimonprez et al. |
| 5,497,411 A | 3/1996 | Pellerin |
| 5,568,121 A | 10/1996 | Lamensdorf |
| 5,585,787 A | 12/1996 | Wallerstein |
| 5,590,038 A | 12/1996 | Pitroda |
| 5,627,355 A | 5/1997 | Rahman et al. |
| 5,655,008 A | 8/1997 | Futch et al. |
| 5,689,247 A | 11/1997 | Welner |
| 5,754,652 A | 5/1998 | Wilfong |
| 5,754,653 A | 5/1998 | Canfield |
| 5,818,030 A | 10/1998 | Reyes |
| 5,825,871 A | 10/1998 | Mark |
| 5,831,862 A | 11/1998 | Hetrick et al. |
| 5,834,747 A | 11/1998 | Cooper |
| 5,834,756 A | 11/1998 | Gutman et al. |
| 5,844,497 A | 12/1998 | Gray |
| 5,883,810 A | 3/1999 | Franklin et al. |
| 5,884,271 A | 3/1999 | Pitroda |
| 5,905,246 A | 5/1999 | Fajkowski |
| 5,913,203 A * | 6/1999 | Wong et al. .............. 705/26 |
| 5,915,226 A | 6/1999 | Martineau |
| 5,917,168 A | 6/1999 | Nakamura et al. |
| 5,936,541 A | 8/1999 | Stambler |
| 5,937,394 A * | 8/1999 | Wong et al. .............. 705/26 |
| 5,940,511 A | 8/1999 | Wilfong |
| 5,953,710 A | 9/1999 | Fleming |
| 5,955,961 A | 9/1999 | Wallerstein |
| 5,956,699 A * | 9/1999 | Wong et al. ............. 235/380 |
| 6,000,832 A | 12/1999 | Franklin et al. |
| 6,003,763 A | 12/1999 | Gallagher et al. |
| 6,012,634 A * | 1/2000 | Brogan et al. ........... 235/380 |
| 6,012,636 A | 1/2000 | Smith |
| 6,024,288 A | 2/2000 | Gottlich et al. |
| 6,029,150 A | 2/2000 | Kravitz |
| 6,029,890 A | 2/2000 | Austin |
| 6,032,134 A | 2/2000 | Weissman |
| 6,038,492 A | 3/2000 | Nichols et al. |
| 6,047,268 A | 4/2000 | Bartoli et al. |
| 6,050,493 A | 4/2000 | Fertig |
| 6,068,184 A | 5/2000 | Barnett |
| 6,068,192 A | 5/2000 | McCabe et al. |
| 6,075,861 A | 6/2000 | Miller, II |
| 6,089,451 A | 7/2000 | Krause |
| 6,101,477 A | 8/2000 | Hohle et al. |
| 6,132,799 A | 12/2000 | Walker et al. |
| 6,163,771 A * | 12/2000 | Walker et al. ............. 705/18 |
| D436,620 S | 1/2001 | Webb et al. |
| 6,188,309 B1 | 2/2001 | Levine |
| RE37,122 E | 4/2001 | Levine et al. |
| 6,215,665 B1 | 4/2001 | Martin |
| 6,224,109 B1 | 5/2001 | Yang |
| 6,227,447 B1 | 5/2001 | Campisano |
| 6,230,977 B1 | 5/2001 | Johnson |
| 6,257,486 B1 | 1/2002 | Gephart |
| 6,339,766 B1 * | 1/2002 | Gephart .................... 705/35 |

\* cited by examiner

METHOD FOR ALLOWING A USER TO CUSTOMIZE USE OF A PAYMENT CARD THAT GENERATES A DIFFERENT PAYMENT CARD NUMBER FOR MULTIPLE TRANSACTIONS

CROSS REFERENCE TO RELATED APPLICATIONS

The present application is a continuation-in-part of U.S. application Ser. No. 09/659,434 filed Sep. 8, 2000 for Method for Generating Customer One-Time Unique Purchase Order Numbers from a Random Number Generator, which is a continuation-in-part of U.S. application Ser. No. 09/640,044 filed Aug. 15, 2000 for Method for Generating Customer One-Time Purchase Order Numbers, which is a continuation-in-part of U.S. application Ser. No. 09/619,859 filed Jul. 20, 2000 for Method for Implementing Anonymous Credit Card Transactions Using a Fictitious Account, which is a continuation-in-part of U.S. application Ser. No. 09/571,707 filed May 15, 2000 for Anonymous Electronic Card for Generating Personal Coupons Useful in Commercial and Security Transactions, all of which disclosures are specifically incorporated herein by reference.

The present application is related to the following four patent applications, all of which are specifically incorporated herein by reference, and all of which are being filed concurrently with the present application on the same date: U.S. patent application Ser. No. 09/667,835, entitled "ELECTRONIC CARD FOR GENERATING A NEW CARD NUMBER WITH EACH USE WITH LED DISPLAY," U.S. patent application Ser. No. 09/667,081, entitled "METHOD FOR USING ELECTRONIC PAYMENT CARD," U.S. patent application Ser. No. 09/667,089, entitled "METHOD FOR STORING DATA IN PAYMENT CARD TRANSACTION," and U.S. patent application Ser. No. 09/667,038, entitled "METHOD FOR CUSTOMIZING PAYMENT CARD TRANSACTIONS AT THE TIME OF THE TRANSACTIONS."

FIELD OF THE INVENTION

The present invention is in the field of methods for making payments through payment cards.

BACKGROUND OF THE INVENTION

Three forms of money in widespread use today throughout the world are cash, checks and payment cards (debit or credit). Each has distinct advantages, and distinct disadvantages. Cash is readily accepted, easy to use and anonymous, but it does not earn interest, it can be lost or stolen, and it is not always readily accessible. Checks are not always accepted, but they offer many advantages, since they do not have to be written until the time of payment. However, they must be physically presented and they are not anonymous. Payment cards are readily, but not always, accepted, and they offer many advantages over checks. If the card is a credit card, payment can be deferred, but the transaction is not anonymous. If the card is a debit card, payment has usually been made prior to its use, but it is anonymous. Accordingly, it is apparent that different types of money have different advantages to different persons in different situations. This may be one reason why all these forms of money are still in widespread use, and are even used by the same persons at different times.

As society and international commerce have become more dependent upon electronic transactions, money has also become more electronic. Many attempts have been made to come up with suitable forms of electronic money that mimic the physical world, or even create new forms of electronic money. However, despite the enormous need for such money, and efforts by some of the best minds and most successful companies in the world, electronic money has suffered many setbacks and been far slower to materialize than many had hoped or predicted. The reasons are many and varied, but some of the obvious reasons are security, ease of use/operation, and unwillingness of the public and/or commerce to make radical changes or embrace new technology and/or procedures. As a result, many efforts, including several potentially promising efforts, have met with failure.

Even though new forms of electronic money have been slow to develop or gain widespread acceptance, electronic payments have still moved forward. Many banks now offer some form of electronic checking. And payment cards have been used for electronic transactions in e-commerce and m-commerce (mobile commerce). Still, there is widespread concern about the safety of such transactions, and recent news stories have uncovered widespread fraudulent activity associated with use of traditional credit card numbers in e-commerce over the Internet. In addition, there is growing concern about consumer privacy, or lack thereof, due to widespread electronic profiling of consumers who make electronic payments.

Although the media has been quick to cover fraud associated with use of credit cards over the Internet, it is often overlooked, at least by the public and the media (but not the credit card companies), that the majority of fraudulent activity concerning credit cards is not associated with e-commerce activity. Most fraud occurs in the "brick and mortar" world, and the numbers are daunting. Despite many attempts to combat unauthorized or fraudulent use of credit cards, it is estimated that credit card fraud now exceeds hundreds of millions, if not several billion, dollars per year. And this does not even count the cost of inconvenience to consumers, merchants and credit card issuer/providers, or the emotional distress caused to victims of such fraud, or the cost to society in terms of law enforcement and preventative activities.

Accordingly, there is a very real, long-felt need to reduce the amount of fraudulent activity that is associated with credit cards, and this need has only grown more acute as consumers and commerce search for better ways to purchase and sell goods and services via e-commerce and m-commerce. However, any solution needs to be something that is acceptable to the public at large. It should be easy to use. It should not be complicated or expensive to implement. Preferably, it should fit within the existing infrastructure, and not be something that requires a great deal of educational effort, or a radical change in behavior or habits of consumers. In other words, it should be user friendly, readily understandable and something that does not require a completely new infrastructure, which is a reason suggested by some as to why smart cards have not been widely accepted in the United States.

In addition, it is highly desirable that any solution to such problems be capable of widespread use, in many different platforms, for many different applications.

In U.S. Pat. No. 5,956,699 issued in Sep. of 1999, Wong and Anderson were the first to introduce the methodology of a system for secure and anonymous credit card transactions on the Internet. This patent introduced a system which used an algorithm to use one's own selected Personal Identification Number or PIN as one's own de facto digital signature. The algorithm instructs the cardholder how to insert one's PIN into one's valid credit card number before using it for any transactions on the Internet. The resultant scrambled up credit card number, which is tailored by the algorithm to having the same number of digits as before, is rendered useless on the Internet because the PIN insertion algorithm is changed automatically after every transaction. This methodology is not only capable of drastically reducing credit card fraud on the Internet, it is also capable of safeguarding one's anonymity, and thus privacy, in credit card purchases on the Internet.

Since the issuance of U.S. Pat. No. 5,956,699, Wong and Anderson have also invented an anonymous electronic card for generating personal Coupons useful in commercial and security transactions, as well as a method for implementing anonymous credit card transactions using a fictitious account name. The present invention is an extension of these prior inventions that seeks to provide new methods for allowing a user to customize the use of one-time unique numbers that can be used in credit card transactions in the brick and mortar world, e-commerce, m-commerce and in many other applications. Because the methodology is well suited for use in hardware and software applications, it has widespread applicability to many different types of transactions. In addition, the present invention allows a user to categorize individual transactions. This new advantage can be used to simplify accounting procedures and consolidate multiple accounts in a single payment credit card. It also opens up many previously unknown possibilities, such as allowing a user to sell data, or protect data, relating to a given transaction.

SUMMARY OF THE INVENTION

The present invention is generally directed to a method for allowing a user to customize use of customer one-time unique purchase order numbers ("Coupons"). The user customizes the method by choosing a selected user key from at least two user keys, either of which can be used to generate a valid Coupon, although the Coupon will be different depending upon which user key is chosen. An algorithm is executed that uses the selected user key and a customer sequence number to generate the Coupon. The sequence number is changed after each Coupon is generated and a new Coupon can then be generated using the changed sequence number and a selected user key for the new Coupon.

In a first, separate aspect of the present invention, at least two different handling options are established between a money source and the user. Once a plurality of payment card transactions are completed between the user and a second entity within a given time period, the user is billed for the plurality of payment card transactions. The money source uses a first handling option for any of the plurality of payment card transactions in which the selected user key is the first user key and a second handling option for any of the plurality of payment card transactions in which the selected user key is the second user key.

In another, separate aspect of the present invention, the first and the second handling options are mechanisms to bill two separate accounts. The user can be sent a single bill for charges to the two separate accounts, even if the accounts are established with different entities, such as different credit card companies or banks, or the user can be sent a first bill for the first account and a separate bill for a second account. One of the accounts can be a credit account and another account can be a debit account. Alternatively, the first and the second handling options can provide a mechanism for classifying the nature of the payment card transactions, such as using the first handling option for business transactions and the second handling option for personal transactions.

In still another, separate aspect of the present invention, the first and second handling options are different mechanisms for controlling access to information concerning payment card transactions. One mechanism can be used to implement restrictions on distribution of information relating to payment card transactions or restrictions on distribution of personal information of the user to third entities. The user can be charged consideration for use of this mechanism. Another mechanism can be used to permit distribution of information relating to payment card transactions to third parties or permit distribution of personal information of the user to second entities. The user can be given consideration to use this mechanism.

In yet another, separate aspect of the present invention, a card number generator is used to generate a payment card number. The card number generator can be included within an electronic payment card, and that card can be capable of storing data so that a standard magnetic stripe reader can read it. The electronic card can be used in an anonymous face-to-face payment card transaction, or it can be used to implement an anonymous Mail Order Telephone Order ("MOTO") credit card transaction between the user and a merchant.

Accordingly, it is a primary object of the present invention to provide a method for generating customer one-time unique purchase order numbers that can be customized by a user.

This and further objects and advantages will be apparent to those skilled in the art in connection with the detailed description of the preferred embodiments set forth below.

DETAILED DESCRIPTION OF THE PREFERRED EMBODIMENTS

Figure 1:
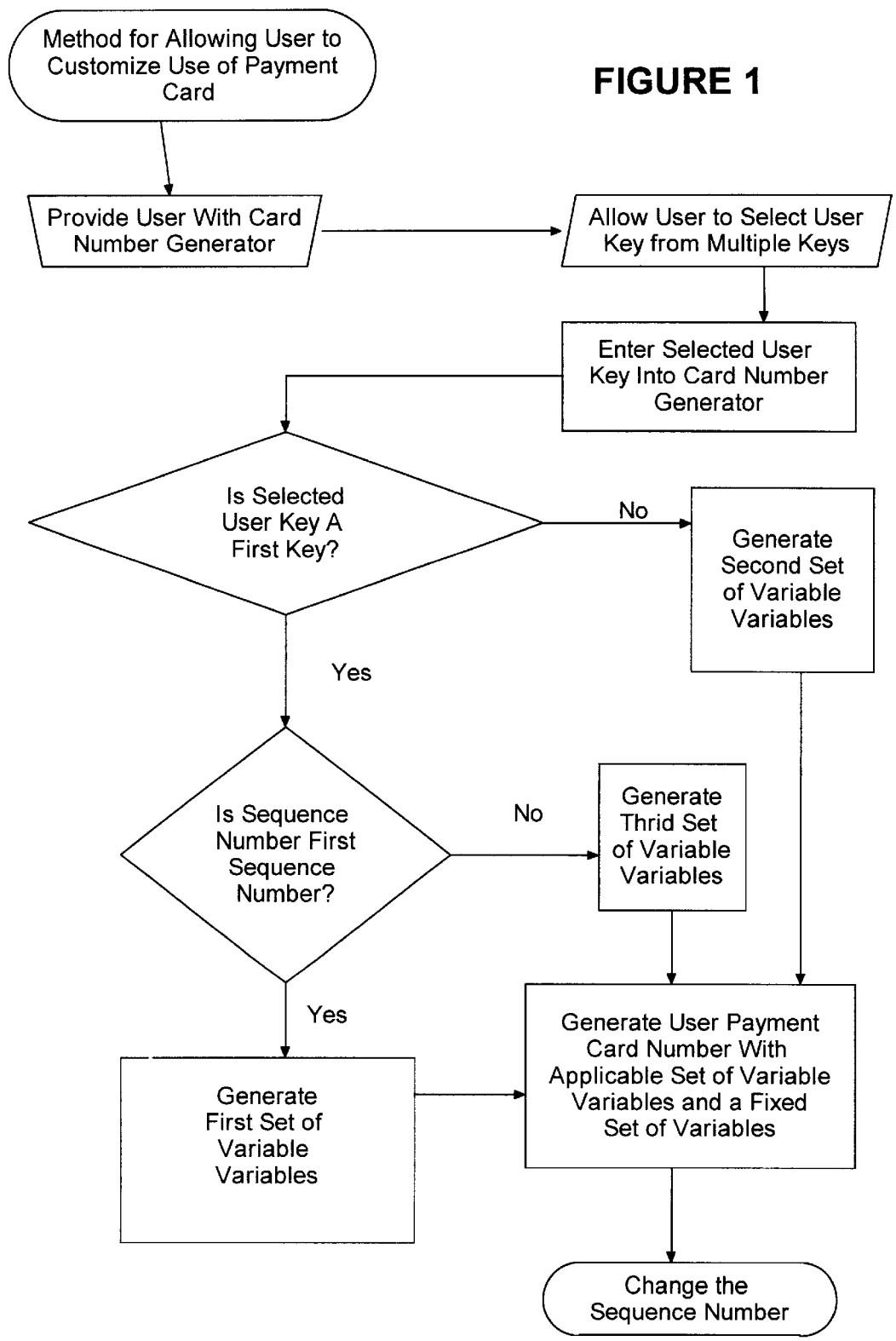
FIG. 1 is a flow chart of a preferred embodiment of the present invention.

The present invention is related to U.S. Pat. Nos. 5913, 203, 5,937,394 and 5,956,699, the disclosures of which are all specifically incorporated herein by reference.

The preferred embodiment of the present invention is adapted for use in many kinds of financial transactions. For example, it can be used in credit card transactions, bank or debit card transactions, or electronic script transactions. Because of the versatility of the preferred embodiment, it can be used in connection with a wide variety of instruments that can be used in connection with such financial transactions. Thus, it can be used with electronic cards, software programs used in network applications, or telephones (especially telephones used in what is now being referred to as m-commerce, or mobile commerce). Moreover, it can be used whether such transactions are conducted in person, face-to-face, or whether such transactions are conducted by an indirect medium, such as a mail order transaction, a transaction conducted over a computer network (for example, the Internet), or a telephone transaction.

As is the case in most financial transactions, three parties are typically involved in completed financial transactions according to the present invention. A party makes a monetary payment. In the context of the following description, this is the first entity, customer or user. Another party receives the monetary payment, and this party can be a single party or two or more parties. In the context of the following description, the party or parties that are receiving the monetary payment are referred to as the second entity. In connection with multiple transactions, the second party can represent the group of second parties involved in the multiple transactions. Finally, there is at least one party, and usually multiple parties, that serve as intermediaries to allow the customer to transfer monetary value to the second entity. The intermediary group of one or more parties will be referred to in the context of the following description as a money source. Thus, the money source may be one or more banks, a credit card company or any other institution involved with issuance of credit cards or bank debit cards, such as a credit union or other institution, or a money source as described in U.S. Pat. No. 5,913,203.

In connection with the preferred embodiment, it is not necessary that the first entity use a real identity, although such an option is also acceptable. Instead, a pseudonym, such as an alias or a fictitious name (which could even be a numeric user identifier), could be used to protect the first entity's privacy and provide additional security.

Although the first entity need not use a real identity, the first entity must establish an account with a money source. When the account is established, the first entity and the money source must agree upon a payment mechanism or protocol. In the case of a credit card or a bank card, this could be done in the same fashion as exists today, and the first entity could select a fictitious account name as is explained in greater detail in co-pending U.S. patent application Ser. No. 09/619,859. It is especially preferred that two different users not be allowed to select the same fictitious account name so that a fictitious account name also represents a unique identifier. However, the preferred embodiment could also be used in connection with a prepaid account. In such a scenario, the first entity could simply purchase a prepaid card and no real identity would ever be required.

When the first entity establishes an account with the money source, a first and a second user key must be selected. The user keys can be a Personal Identification Number, or "PIN," similar to that which is currently in widespread use in the United States in connection with automated teller machines. Both the first entity and the money source must have access to the user keys, which can be selected by either entity. In order to be able to retrieve the user keys, the money source creates a record associated with the first entity that includes the user keys and a first entity identifier (whether this be the real name of the first entity or a fictitious account name). As part of establishing the account, a different handling option can be selected for each user key. The possibility of different handling options, as will be discussed later, creates incredible opportunities for customized use of the account with respect to individual transactions.

Once the first entity has established an account with the money source and multiple user keys are selected, the first entity must be supplied with the means to generate a customer one-time unique purchase order number ("Coupon") or a one-time card number. As already described, this could be hardware or software, but, in either case, it will preferably include a customer random number generator and a customer sequence number. It is especially preferred that the first entity be provided with an electronic card, and that the electronic card be of the type described in U.S. application Ser. No. 09/571,707 filed May 15, 2000 for Anonymous Electronic Card for Generating Personal Coupons Useful in Commercial and Security Transactions, or in Ser. No. 09/667,835 filed concurrently herewith.

Several different methods that can be used to generate a Coupon are described in detail in the earlier-filed applications that are identified in the Cross-Reference to Related Applications above, and which are incorporated herein by reference, so the details of those methods will not be repeated here. No matter what method is used to generate a one-time card number, there are two requirements for the present invention. First, two successive one-time card numbers will be different, even if the same algorithm uses the same selected user key. This is accomplished by using a sequence number in the algorithm that is changed after each one-time card number is generated. Second, for the same sequence number, the algorithm will generate a different one-time card number when the selected user key is different. (The present invention does not require that all theoretical possibilities will result in different one-time card numbers. Instead, it is preferred that there be a low probability of occurrence of identical one-time card numbers attributable to convergence of two different inputs leading to the same result due to operations performed on the inputs by the algorithm.)

When the user wishes to generate a Coupon, the user must chose which user key will be used as the selected user key to generate the Coupon. Once the selected user key is chosen, it is entered into a card number generator or electronic payment card, and used to generate a Coupon in accordance with the applicable algorithm. After the Coupon is generated, it is used and validated in the same manner as is described in earlier applications, except that the validation process must account for a separate sequential set of possible Coupons for each user key that might be chosen by the user as the selected user key, and synchronization must apply to all such sequential sets.

A Coupon is validated when the money source determines that the Coupon is valid for the first entity identifier submitted with the Coupon. In order to determine what Coupons might be valid for the first entity, the money source determines what Coupons the first entity might generate, and the order in which they will be generated. One way that the money source can determine what Coupons might be generated by the first entity is to generate Coupons from the same starting input that would be used by the first entity, using the same random number generator. In other words, the money source uses one or more money source random generators that use the same algorithm as the customer random generator (including initial seed(s) and constants), using the same user keys that are available to the user. Thus, when the money source generates a money source Coupon from a money source sequence number that is identical to a customer sequence number used by a customer to generate a Coupon, the money source Coupon should be identical to, and thus match, the Coupon, when the selected user key is identical. This, in turn, validates the Coupon.

The need to validate a Coupon or a one-time card number points out a major distinction between validation of a traditional payment card number and a one-time payment card number in accordance with the present invention.

A traditional payment card number can be characterized as having three parts. First, there is a set of fixed variables. This contains numerals that represent certain specified data fields, such as a bank identifier and a month and year expiration date for a given payment card. Second, there is a set of variable variables. This contains numerals that will vary for different accounts, even if issued by the same bank. Third, there is a check sum bit. The check sum bit functions as a check sum and its value is dictated by the other numerals in the card number.

In the context of the present invention, a user one-time card number is akin to a traditional payment card number, with certain exceptions. In a traditional payment card number, there might be a set of six fixed variables, followed by a set of nine variable variables, followed by a check sum bit and another set of four fixed variables representing the month and year (last two digits only). In use, a user would always give the same twenty digits for this account. By contrast, when a user uses a one-time card number according to the preferred embodiment of the present invention, the number will change between any two successive uses because the sequence number will change, and the selected user key may change, which should mean that the set of variable variables will change between the two successive uses. Also, since the one-time card number varies with successive usage, the check sum bit will not necessarily be the same with successive usage, although it may be. Thus, the check sum bit must be recalculated for each new one-time card number, and this is why it shall be referred to as a "check sum variable" in the context of a one-time card number according to the present invention.

Once a Coupon is validated, the money source can determine what user key was used to generate the Coupon, which allows the money source to determine what handling option should be used for the transaction involving the Coupon. (It also allows the money source to determine what sequence number is associated with the Coupon, so that its records can be synchronized as part of the validation process.)

One use of multiple handling options is to allow the money source to access multiple accounts. For example, a user might use one account as a credit card, and another account as a debit or checking card. By choosing which account should be used for a given transaction, the user could determine, at the point of use, whether to charge the transaction, or have it deducted from an existing account balance. The same idea could be used for multiple credit cards, whether they be from the same issuer or different issuers, or even different cards, such as Visa®, MasterCard®, Diner's Card®, Discover® or American Express®. In addition, the user might elect to have separate billing statements for separate accounts, or have all billing consolidated in a single statement.

Another use of multiple handling options is to allow identification of the person completing a transaction, or to allow multiple persons access to a single account, or place different restrictions on multiple persons on a single account. For example, a single account might be opened with an issuing bank, but an entire family might be authorized to use the account. Thus, a father and a mother might have their own user keys, a teenage child might have another user key and a lower authorized spending limit, and a preteen child might have a fourth user key, but only be authorized to engage in a certain limited number of transactions per time period with a maximum spending limit for each transaction. All the members of this family could use the same card number generator embedded within a PDA or mobile phone, or on a computer, or in an electronic card. At the end of a specified billing cycle, all transactions completed by any member of this family could be consolidated in a single bill, and that bill could indicate who spent what when during the billing cycle, and what it was spent on.

Still another use of multiple handling options is to allow a user to classify the nature of a particular transaction at the time it is completed. For example, suppose an individual uses a single credit card for personal expenditures and business expenditures. By assigning one user key to personal transactions, and a second user key to business transactions, the user can simplify accounting for such transactions without the necessity of having and carrying two separate cards. If desired, the user could even receive two separate statements for such expenditures so that the personal expenditures would not be discernable from the documentation associated with the business expenditures.

Yet another use of multiple handling options is to allow a user to preselect how a particular transaction is treated in a subsequent bill. For example, an individual user might not want a billing statement to include information about the identity of second entities who provide certain goods or services, or when transactions with such entities take place, but still want to have the billing statement include such information for other transactions. By selecting two different user keys with these two different handling options, the user has the option of controlling what information it receives in billing statements about individual transactions.

Multiple handling options can also be used to guard privacy, or for commercial purposes that do not presently exist. For example, the user and the money source might enter into an agreement about how, and under what circumstances, the money source can distribute information about transactions of the user, depending upon which user key is used in a given transaction. The agreement might provide different levels of confidentiality, and set up different levels or types of compensation tied to transactions falling within the different levels for a given time period.

One level of confidentiality might restrict distribution of any information concerning a transaction by the money source to any third party. For example, a user might want strict confidentiality of any transaction involving medical services, and would not want the money source to divulge that information to any party unless legally required to do so. Or, maybe the user does not want any third party to learn of any transaction that exceeds a certain dollar amount, for fear of a potential deluge of unsolicited advertising. A user might pay a monthly fee for use of this option, a transaction based fee, or no fee at all.

A second level of confidentiality might permit distribution of any information concerning a transaction by the money source to any third party. Such information is potentially valuable for purposes of advertising, and creating profiles for targeted marketing, and the money source might even pay the user for the right to sell such information.

Other levels of confidentiality might fall between those already noted. For example, a third level might permit distribution of certain information concerning a transaction (such as the payee, the amount of purchase, the date of purchase, and a profile of the user), but restrict distribution of other information concerning a transaction (such as the identity of the user). Another level of confidentiality might restrict distribution of information concerning a transaction to any third party, but allow the money source to use such information for its own marketing efforts directed to the user.

Thus, it is readily apparent that multiple handling options for individual transactions create an enormous opportunity for customization on the part of the user, as well as the money source, and that this opens up entirely new methodologies and possibilities that never existed before.

Although the foregoing detailed description is illustrative of preferred embodiments of the present invention, it is to be understood that additional embodiments thereof will be obvious to those skilled in the art. Further modifications are also possible in alternative embodiments without departing from the inventive concept.

Accordingly, it will be readily apparent to those skilled in the art that still further changes and modifications in the actual concepts described herein can readily be made without departing from the spirit and scope of the disclosed inventions as defined by the following claims.

What is claimed is:

1. A method for allowing a user to customize use of a payment card, comprising the steps of:

providing the user with a card number generator;

allowing the user to choose one of a plurality of user keys as a selected user key;

entering the selected user key into the card number generator;

generating a user payment card number from the card number generator in accordance with an algorithm that uses the selected user key and a user sequence number to generate the user payment card number; and changing the user sequence number;

wherein the user payment card number is comprised of a set of fixed variables and a set of variable variables;

wherein the algorithm generates a first set of variable variables for a first user sequence number when the selected user key is a first key of the plurality of user keys and a second set of variable variables for the first user sequence number when the selected user key is a second key of the plurality of user keys; and wherein the algorithm will generate a third set of variable variables for a second user sequence number when the selected user key is the first key of the plurality of user keys.

2. The method as recited in claim 1, wherein the set of fixed variables will be the same whether the algorithm uses the first key or the second key of the plurality of user keys.

3. The method as recited in claim 1, wherein the set of fixed variables will be different if the algorithm uses the second key instead of the first key of the plurality of user keys.

4. The method as recited in claim 1, wherein the user payment card number is further comprised of a check sum variable.

5. The method as recited in claim 4, wherein the user payment card number is a fixed number of digits.

6. The method as recited in claim 1, wherein the card number generator is included within an electronic payment card.

7. A method for implementing an anonymous face to face payment card transaction between a user and a merchant that allows the user to customize use of a payment card, comprising the steps of:

establishing a user account between a credit source and the user which is associated with a fictitious account name, a user account number, a first user key, a second user key and a user settlement mechanism through which the user can pay the credit source for charges and fees billed to the user account;

providing the user with an electronic card that is comprised of:

a card base;

a storage medium affixed to the card that can be read by a card reader;

a computer affixed to the card;

an input mechanism for providing input to the computer; and a power source for supplying power to the computer;

wherein the electronic card has a fictitious account name stored in a memory device accessible by the computer, the computer is capable of causing data to be stored in the storage medium and the electronic card is sized such that a standard magnetic stripe reader can read the magnetic storage medium; and completing a face to face credit card transaction between the user and the merchant in which the user is charged a monetary value by the merchant, comprising the following steps:

allowing the user to choose either the first user key or the second user key as the selected user key for the transaction;

entering the selected user key into the input mechanism;

executing an algorithm by the computer that uses the selected user key as an input variable to generate a valid personal charge number;

reading the valid personal charge number and the fictitious account name by the card reader;

sending the monetary value, the valid personal charge number and the fictitious account name to a credit approval center that verifies that the valid personal charge number is valid for the fictitious account name and approves the face to face credit card transaction;

sending an approval of the transaction from the credit approval center to the merchant; and billing the user for the transaction through the user settlement mechanism.

8. The method as recited in claim 7, wherein the method of billing the user will vary depending upon whether the selected user key is the first user key or the second user key.

9. A method for implementing an anonymous Mail Order Telephone Order ("MOTO") credit card transaction between a user and a merchant that allows the user to customize use of a payment card, comprising the steps of:

establishing a user account between a credit source and the user which is associated with a fictitious account name, a user account number, a first user key, a second user key and a user settlement mechanism through which the user can pay the credit source for charges and fees billed to the user account;

providing the user with an electronic card that is comprised of:

a card base;

a storage medium affixed to the card that can be read by a card reader;

a computer affixed to the card;

an input mechanism for providing input to the computer;

a display controlled by the computer; and a power source for supplying power to the computer;

wherein the electronic card has a fictitious account name stored in a memory device accessible by the computer, the computer is capable of causing data to be stored in the storage medium and the electronic card is sized such that a standard magnetic stripe reader can read the magnetic storage medium;

completing a MOTO credit card transaction between the user and the merchant in which the user is charged a monetary value by the merchant, comprising the following steps:

allowing the user to selected either the first user key or the second user key as a selected user key;

entering the selected user key into the input mechanism;

executing an algorithm by the computer that uses the selected user key to generate a valid personal charge number;

visually reading the valid personal charge number from the display;

providing the valid personal charge number and the fictitious account name to the merchant;

sending the monetary value, the valid personal charge number and the fictitious account name to a credit approval center that verifies that the valid personal charge number is valid for the fictitious account name and approves the MOTO credit card transaction;

sending an approval of the transaction from the credit approval center to the merchant; and billing the user for the transaction through the user settlement mechanism.

10. The method as recited in claim 9, wherein the method of billing the user will vary depending upon whether the selected user key is the first user key or the second user key.

11. A method for providing multiple secure transactions between a first entity and at least one additional entity, comprising the steps of:

(1) generating a customer one-time unique purchase order number ("Coupon") for the first entity by the following steps:
  (a) allowing a user to choose either a first user key or a second user key as a selected user key;
  (b) combining the selected user key with a customer permutation variable that is correlated with a customer sequence number to form a customer permutated user key;
  (c) using a customer random number generator to generate a customer user insertion key that is correlated with the customer sequence number; and
  (d) generating a Coupon by inserting the permutated user key into a user account number in accordance with an algorithm that uses the customer user insertion key;

(2) transferring the Coupon and a first entity identifier to a second entity;

(3) transferring the Coupon and the first entity identifier from the second entity to a money source;

(4) creating a first sequential set of the money source having a first preselected number of money source Coupons for the first entity by the following steps:
  (a) combining the first user key with a first money source permutation variable that is correlated with a first money source sequence number to form a first money source permutated user key;
  (b) using a first money source random number generator to generate a first money source user insertion key that is correlated with the first money source sequence number;
  (c) generating a first money source Coupon from the user account number by inserting the first money source permutated user key into the user account number in accordance with the algorithm that uses the money source user insertion key, wherein the first money source Coupon is correlated with the first money source sequence number and stored in the first sequential set, said first money source Coupon being identical to the Coupon when the customer permutation variable and the first money source permutation variable are identical and the selected key is the first user key;
  (d) changing the first money source sequence number; and
  (e) repeating steps (a) through (d) as needed so that the first sequential set has the first preselected number of money source Coupons;

(5) creating a second sequential set of the money source having a second preselected number of money source Coupons for the first entity by the following steps:
  (a) combining the second user key with a second money source permutation variable that is correlated with a second money source sequence number to form a second money source permutated user key;
  (b) using a second money source random number generator to generate a second money source user insertion key that is correlated with the second money source sequence number;
  (c) generating a second money source Coupon from the user account number by inserting the second money source permutated user key into the user account number in accordance with the algorithm that uses the money source user insertion key, wherein the second money source Coupon is correlated with the second money source sequence number and stored in the second sequential set, said second money source Coupon being identical to the Coupon when the customer permutation variable and the second money source permutation variable are identical and the selected key is the second user key;
  (d) changing the second money source sequence number; and
  (e) repeating steps (a) through (d) as needed so that the second sequential set has the second preselected number of money source Coupons;

(6) verifying that the Coupon is valid for the first entity by
  (a) either confirming that it is identical to a matching money source Coupon contained within the first or the second sequential set, or
  (b) confirming that is identical to a first or a second matching money source Coupon contained in a recent history file that contains one or more first or second money source Coupons deleted from the sequential set;

(7) deleting the matching money source Coupon and, if the matching money source Coupon was contained in the first or the second sequential set, deleting all earlier created money source Coupons from the first and the second sequential sets;

(8) changing the customer sequence number; and (9) repeating steps (2) through (8).

12. A method for generating customer one-time unique purchase order numbers ("Coupons"), comprising the steps of:

(1) allowing a user to select either a first user key or a second user key as a selected user key;

(2) combining the selected user key with a permutation variable that is correlated with a sequence number to form a permutated user key;

(3) using a random number generator to generate a user insertion key that is correlated with the sequence number;

(4) executing an algorithm that uses the permutated user key and the user insertion key as input variables to form a Coupon that is correlated with the sequence number;

(5) changing the sequence number; and (6) repeating steps (1) through (5) at least once.

13. A method for conducting payment card transactions in which a user of the payment card can customize use of a payment card, comprising the steps of:

(1) establishing a first and a second handling option between a money source and the user;

(2) providing the user with a card number generator;

(3) completing a plurality of payment card transactions between the user and a second entity within a time period in accordance with the following steps:

(a) allowing the user to choose a first user key or a second user key as a selected user key;

(b) entering the selected user key into the card number generator;

(c) generating a user payment card number from the card number generator in accordance with an algorithm that uses the selected user key and a user sequence number to generate the user payment card number;

(d) transferring the user payment card number and a first entity identifier to the second entity; and (e) transferring the user payment card number, the first entity identifier and a monetary value from the second entity to the money source that verifies that the payment card number is valid for the first entity identifier and approves the payment card transaction;

(f) changing the user sequence number; and (g) repeating steps (a) through (f) at least once within the time period, each of the plurality of payment card transactions having a new user payment card number; and (4) billing the user for the plurality of payment card transactions, wherein the money source uses the first handling option for any of the plurality of payment card transactions in which the selected user key is the first user key and the second handling option for any of the plurality of payment card transactions in which the selected user key is the second user key.

14. The method as recited in claim 13, wherein each new user payment card number is comprised of a set of fixed variables and a set of variable variables;

wherein the algorithm will generate a first set of variable variables for a first user sequence number when the selected user key is the first user key and a second set of variable variables for the first user sequence number when the selected user key is the second user key; and wherein the algorithm will generate a third set of variable variables for a second user sequence number when the selected user key is the first key.

15. The method as recited in claim 14, wherein the set of fixed variables will be the same whether the algorithm uses the first user key or the second user key.

16. The method as recited in claim 14, wherein the set of fixed variables will be different if the algorithm uses the second user key instead of the first user key.

17. The method as recited in claim 14, wherein the card number generator is included within an electronic payment card.

18. The method as recited in claim 17, wherein the electronic payment card is comprised of:

a card base;

a storage medium affixed to the card that can be read by a card reader;

a computer affixed to the card;

an input mechanism for providing input to the computer;

a display controlled by the computer; and a power source for supplying power to the computer;

wherein the electronic card has an account name stored in a memory device accessible by the computer, the computer is capable of causing data to be stored in the storage medium and the electronic card is sized such that a standard magnetic stripe reader can read the magnetic storage medium.

19. The method as recited in claim 17, wherein the electronic payment card is comprised of:

a card base;

a computer affixed to the card;

a keypad for providing input to the computer, the keypad having ten numeric keys and at least one special function key that are touch-activated;

a magnetic storage medium affixed to the card that can be read by a standard magnetic stripe reader;

an encoder controlled by the computer for generating a data packet that is stored in a designated portion of the magnetic storage medium; and a power source for supplying power to the computer and the encoder;

wherein the electronic card is sized such that the magnetic storage medium can be read by a standard magnetic stripe reader.

20. The method as recited in claim 13, wherein the first and the second handling options are mechanisms to bill two separate accounts.

21. The method as recited in claim 20, wherein the user is sent a single bill for charges to the two separate accounts.

22. The method as recited in claim 21, wherein one of the accounts is established with a first money source and the second account is established with a second money source that is different from the first money source.

23. The method as recited in claim 20, wherein one of the accounts is a credit account and the second account is a debit account.

24. The method as recited in claim 20, wherein the user is sent a first bill for the first account and a separate bill for the second account.

25. The method as recited in claim 13, wherein the first and the second handling options are a first and a second mechanism for dealing with distribution of information concerning the plurality of payment card transactions.

26. The method as recited in claim 25, wherein the first mechanism restricts the distribution from the money source to a third party of information relating to any payment card transaction in which the user payment card number was generated by use of the first user key.

27. The method as recited in claim 25, wherein the first mechanism restricts the distribution from the money source to the second entity of personal information of the user relating to any payment card transaction in which the user payment card number was generated by use of the first user key.

28. The method as recited in claim 26, wherein the user provides the money source with consideration for use of the first mechanism.

29. The method as recited in claim 25, wherein the second mechanism permits the distribution from the money source to a third party of information relating to any payment card transaction in which the user payment card number was generated by use of the second user key.

30. The method as recited in claim 29, wherein the second mechanism permits the distribution from the money source to the second entity of personal information of the user relating to any payment card transaction in which the user payment card number was generated by use of the second user key.

31. The method as recited in claim 29, wherein the money source provides the user with consideration for use of the second mechanism.

32. The method as recited in claim 13, wherein the first and the second handling options provide a mechanism for classifying the nature of the plurality of payment card transactions.

33. The method as recited in claim 32, wherein the first handling option is used for business transactions and the second handling option is used for personal transactions.

34. The method as recited in claim 13, wherein the first and the second handling options provide a mechanism for identifying either a first user or a second user as the user.

35. The method as recited in claim 34, wherein approval of a payment card transaction for the first user is subject to different restrictions than approval of a payment card transaction for the second user.

36. The method as recited in claim 13, wherein the first and the second handling options provide a mechanism for controlling what information is reported about the plurality of payment card transactions in a billing statement.

* * * * *